US010665126B2

(12) United States Patent
Gonzalez, Jr.

(10) Patent No.: US 10,665,126 B2
(45) Date of Patent: May 26, 2020

(54) METHOD AND APPARATUS FOR ASSISTING AND EDUCATING PATIENT MOBILITY AND RECOVERY

(71) Applicant: Andres Gonzalez, Jr., Austin, TX (US)

(72) Inventor: Andres Gonzalez, Jr., Austin, TX (US)

( * ) Notice: Subject to any disclaimer, the term of this patent is extended or adjusted under 35 U.S.C. 154(b) by 311 days.

(21) Appl. No.: 15/908,607

(22) Filed: Feb. 28, 2018

(65) Prior Publication Data

US 2019/0266913 A1    Aug. 29, 2019

(51) Int. Cl.
*G09B 19/00* (2006.01)
*A41B 11/00* (2006.01)
*G08B 5/36* (2006.01)

(52) U.S. Cl.
CPC .......... *G09B 19/003* (2013.01); *A41B 11/008* (2013.01); *A41B 2400/32* (2013.01); *G08B 5/36* (2013.01)

(58) Field of Classification Search
CPC .................................................... G09B 19/003
USPC ........................................................ 434/255
See application file for complete search history.

(56) References Cited

U.S. PATENT DOCUMENTS

| 2011/0036252 A1* | 2/2011 | Middo | B41J 3/4078 |
| | | | 101/327 |
| 2013/0096478 A1* | 4/2013 | Cureton | A61F 13/00051 |
| | | | 602/43 |

* cited by examiner

*Primary Examiner* — Kesha Frisby

(57) ABSTRACT

An apparatus and method for assisting and educating patient mobility and recovery are disclosed. In one embodiment, wearable garments, such as socks, include at least one visual indicator to instruct and educate patients to ensure that the proper foot is used for mobility and recovery. The wearable garments includes a number of visual indicators to aid with instruction and education even for patients with visual impairments. The wearable garments additionally includes a non-skid bottom surface for preventing slips.

7 Claims, 2 Drawing Sheets

METHOD AND APPARATUS FOR ASSISTING AND EDUCATING PATIENT MOBILITY AND RECOVERY

FIELD OF THE INVENTION

The present invention relates generally to a method and apparatus for assisting and educating patients in physical therapy and recovery from mobility impairment.

BACKGROUND OF THE INVENTION

Falls are a major risk factor as people age. Falls may result in fractures of the back, hip, knee, ankle, and other body parts. When an injury does occur, a patient may have a surgical procedure to repair the fracture or even replace the affected joint. Following surgery the patient typically receives physical therapy for a short period prior to being discharged from the hospital. During therapy, the patient is trained on how to safely and correctly ambulate using an assistive device (i.e. walker, cane, crutches) on level terrain and uneven terrain such as curbs or stairs. Patient education in this acute setting is sometimes difficult because of other physical or mental issues occurring concurrently. For example, a patient may be in severe pain or heavily medicated, thus impairing his or her ability to retain instruction. For some patients, there may also be a language barrier between the patient and his or her therapist, further impairing the patient's ability to comprehend and retain the provided education. The patient's inability to remember their training on proper ambulation and use of their assistive device may result in additional falls or further injury once they are discharged. These additional injuries can result in re-hospitalization, additional surgeries, increased pain, and longer recovery times for the patient.

When a patient is discharged home from the hospital, the patient is often set-up for Home Health Physical Therapy. Upon evaluation by the home health therapist, patients are frequently noted to be ambulating incorrectly. When the patients are asked why they are walking incorrectly, most patients say they forgot what they were taught or how they were trained, or that they had not understood the teaching provided by the acute therapist due to a language barrier. Other patients also cite their heavy medication and the multitude of discharge instructions provided at one time as the source of their confusion. A patient's primary goal when receiving physical therapy at home is to be independent and safe with all activities in the home and in the community with their families, thus avoiding further falls and injury.

Errors frequently noted in a patient's ambulation are:
Placing the wrong foot forward when ambulating on even terrain; and
Going up or down stairs and curbs leading with the wrong foot
There is a lack of visual instruction and physical training tools on how to ambulate correctly when patients are discharged from the hospital. If these training tools were available, they could reduce the risk of further injury and improve a patient's overall quality of life. The present invention addresses that need and serves to benefit English and non-English speaking patients.

The present invention discloses a wearable garment used in pairs which acts as a training tool, providing visual cues to patients and helping them to ambulate correctly using an assistive device.

SUMMARY OF THE INVENTION

This invention relates to wearable garments, such as socks for assisting and educating patients in physical therapy and recovery from mobility impairment by using visual indicators and instructions.

In one method, a patient wears the specifically designed socks and identifies the first visual instructions on a first sock thereby moving the first foot in accordance with the first visual instruction. The patient then identifies the second visual instructions thereby moving the second food in accordance with the second visual instruction.

In an additional method, the visual instructions include different language texts for "UP" or "DOWN" as well as indicators for "GO" and "STOP."

In one embodiment of the apparatus, the wearable garments include a non-skid bottom surface for further preventing injuries. The wearable garments include color visual instructions for patients as well as text-based visual instructions. In addition, in this embodiment, the wearable garments are preferably seamless.

BRIEF DESCRIPTION OF THE DRAWINGS

Embodiments of the invention will now be described, by way of example, with reference to the accompanying drawings, wherein.

DETAILED DESCRIPTION OF THE DRAWINGS

The following description provides details with reference to the accompanying drawings. It should be understood that the invention may be embodied in many different forms and should not be construed as limited to the embodiments set forth herein. The apparatus and method described herein may be implemented on any wearable garment for placement around the outside of a patient's feet.

Figure 1:
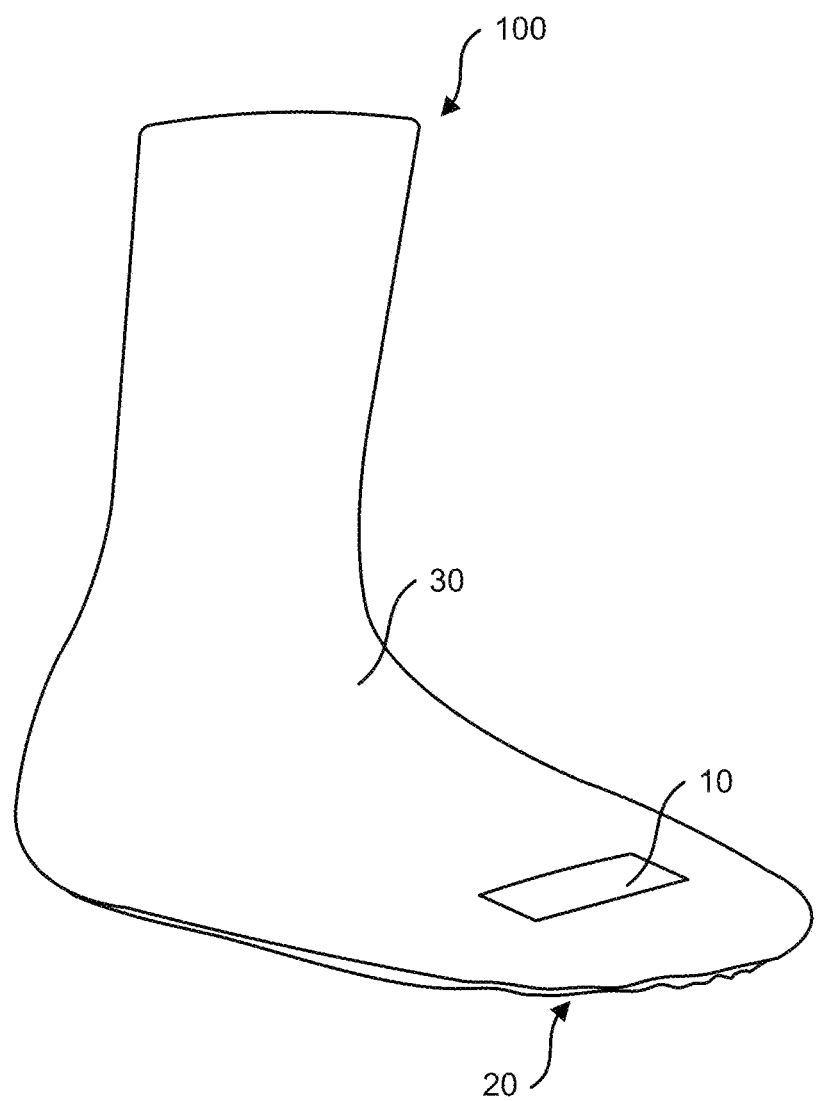
FIG. 1 is a perspective view of a first wearable garment from a pair of wearable garments according to an exemplary embodiment of the present invention.

FIG. 1 shows a perspective view of a first wearable garment 100 according to an exemplary embodiment of the present invention. The first wearable garment 100 is part of a pair of wearable garments in the present invention.

Figure 3:
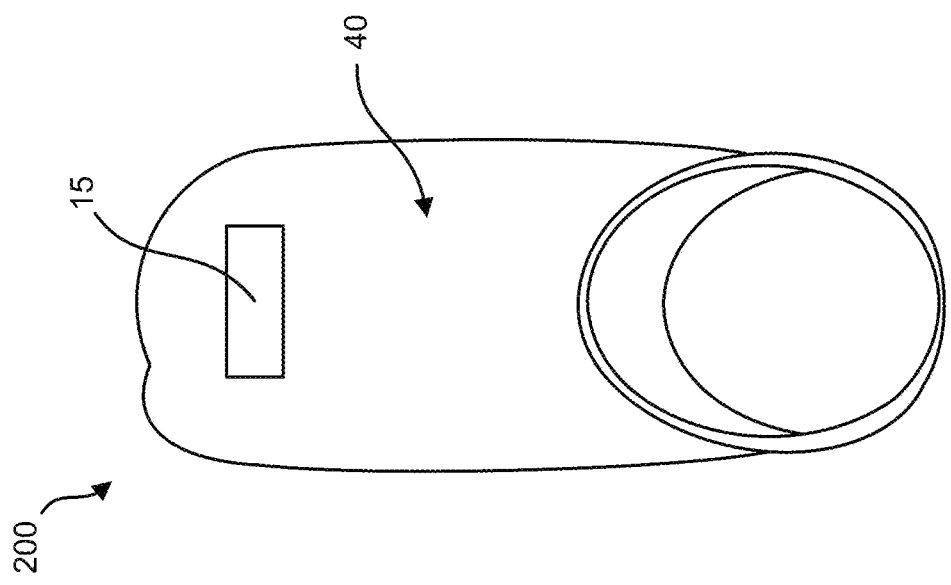
FIG. 3. is a top view of a second wearable garment from a pair of wearable garments according to an exemplary embodiment of the present invention.
Figure 2:
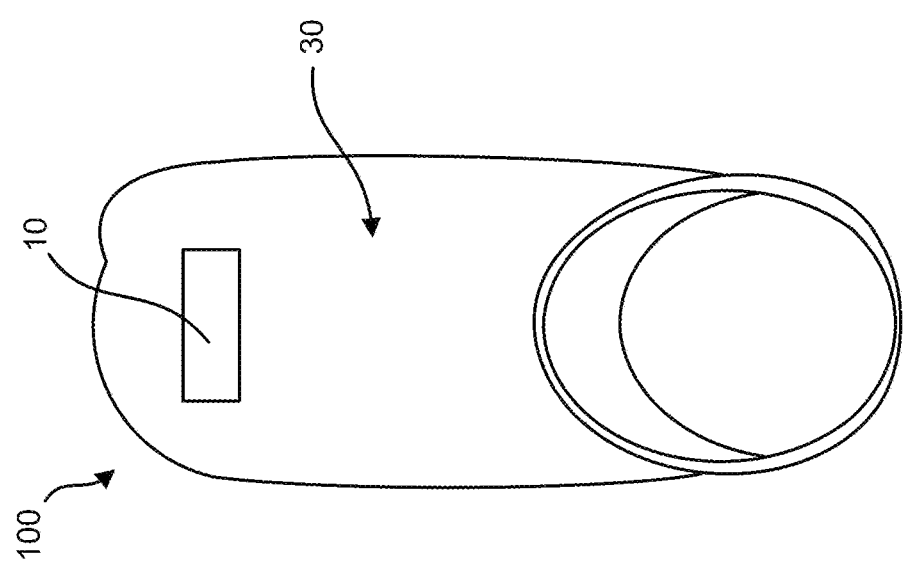
FIG. 2 is a top view of a first wearable garment from a pair of wearable garments according to an exemplary embodiment of the present invention.

Preferably, the first wearable garment 100 is a sock or any other wearable garment that may be placed around the outside of a patient's feet. The sock 100 preferably includes a color visual indicator 30, such as a color. In the case of a patient being taught which foot must be placed forward first during rehabilitation, the sock 100 preferably includes a green or red color as a color visual indicator 30. As shown in FIGS. 2 and 3, socks 100, 200 would preferably have a first color visual indicator 30 of green, while the other sock has a color visual indicator 40 of red to indicate "Go/Good" or "Stop/Bad," respectively. Other colors may also be used as color visual indicators without departing from the spirit of the invention.

The sock 100 also includes a text-based visual indicator 10. The text-based visual indicator 10 is preferably text printed or affixed to the sock 100. The text-based visual indicator 10 would preferably have the text "UP" or "ARRIBA." As seen in FIGS. 2 and 3, a text-based visual indicator 15 on a second wearable garment as part of a pair of wearable garments would have the text "DOWN" or "ABAJO." However, the text-based visual indicator could be in any other language understandable by the patient.

The color visual indicator 30 is particularly beneficial to patients with visual problems such as macular degeneration, glaucoma, cataracts, blurred vision, etc. Patients would be able to distinguish the bright green or red colored to aid them in being able to ambulate correctly using their assistive device or going up and down the stairs. By combining the text-based visual indicator 10 along with the color visual indicator 30, patients have multiple ways that will visually train them on ambulating correctly and safely in their home or other environments.

Also shown in FIG. 1 is a bottom surface having a non-skid material 20. The non-skid material 20 may be made of rubber or any other material shown to improve friction and grip on most surfaces. The non-skid material 20 further reduce the risk of slipping and/or skidding when standing or walking.

Additionally, it is envisioned that in an exemplary embodiment, sock 100 is constructed from an anti-bacterial material and be formed from synthetic blends containing moisture wicking features to further reduce the risk of blistering and wounds. Additionally, the sock 100 of the exemplary embodiment would preferably be made of a seamless material having non-binding tops to avoid constriction of a patient's ankles because of the possibility of patients having edema or impaired circulation.

Proper training and education on the use of sock 100 can be performed by healthcare professionals such as such as physical therapists, occupational therapists, nurses, and physicians. Proper training from health care professionals will be beneficial to patients to instruct them on proper use and gait training. Additionally, proper training can also benefit but family and caregivers who can additionally reduce the risk of further injury for the patient.

Although the present invention is described generally with respect to socks, the invention envisions that any wearable garment for a patient's lower extremities, such as feet, are within the spirit of the invention. It is to be understood that the above descriptions and drawings are only for illustrating representative variations of the present invention and are not intended to limit the scope thereof. Any variation and derivation from the above description and drawings are included in the scope of the present invention.

What is claimed is:

1. A method of assisting mobility recovery, the method comprising the steps of:
    wearing a pair of reusable socks, wherein the reusable socks includes:
        a first sock having first visual instructions equivalent to indicate the movement of a first foot;
        a second sock having second visual instructions equivalent to indicate the movement of a second foot;
    moving the first foot in accordance with the first visual instructions; and
    moving the second foot in accordance with the second visual instructions.

2. The method of claim 1 wherein the first visual instructions are the instructions "up."

3. The method of claim 1 wherein the first visual instructions are the instructions "arriba."

4. The method of claim 1 wherein the second visual instructions are the instructions "down."

5. The method of claim 1 wherein the second visual instructions are the instructions "abajo."

6. The method of claim 1 wherein the first sock includes a green visual indicator.

7. The method of claim 1 wherein the second sock includes a red visual indicator.

* * * * *